(12) United States Patent
Ebihara

(10) Patent No.: US 12,487,089 B2
(45) Date of Patent: Dec. 2, 2025

(54) DECIDING A VEHICLE STOP POSITION IN A VICINITY OF AN EXIT WHEN FOLLOWING A LEADING VEHICLE

(71) Applicant: TOYOTA JIDOSHA KABUSHIKI KAISHA, Toyota (JP)

(72) Inventor: Yuji Ebihara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/404,330

(22) Filed: Jan. 4, 2024

(65) Prior Publication Data

US 2024/0295401 A1 Sep. 5, 2024

(30) Foreign Application Priority Data

Mar. 3, 2023 (JP) ................................. 2023-032499

(51) Int. Cl.
*B60W 40/04* (2006.01)
*B60W 30/095* (2012.01)
*G01C 21/28* (2006.01)

(52) U.S. Cl.
CPC ......... *G01C 21/28* (2013.01); *B60W 30/0956* (2013.01); *B60W 40/04* (2013.01)

(58) Field of Classification Search
CPC ... G01C 21/28; B60W 30/0956; B60W 40/04; B60W 30/181
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2014/0303880 A1* | 10/2014 | Tuukkanen | G08G 1/096741 701/117 |
| 2017/0301237 A1* | 10/2017 | MacNeille | H04W 68/005 |
| 2018/0162390 A1* | 6/2018 | Miura | B60W 30/09 |
| 2019/0295419 A1 | 9/2019 | Tosa et al. | |
| 2019/0375430 A1* | 12/2019 | Emura | G08G 1/00 |
| 2019/0389465 A1* | 12/2019 | Ogino | B60T 7/22 |
| 2022/0153266 A1* | 5/2022 | Muyshondt | B60W 40/04 |

FOREIGN PATENT DOCUMENTS

JP 2007-310745 A 11/2007

* cited by examiner

*Primary Examiner* — Dino Kujundzic
(74) *Attorney, Agent, or Firm* — Sughrue Mion, PLLC

(57) ABSTRACT

A driving assist device for a vehicle includes: a storage device that stores map information; and a processor that executes a process of following up a leading vehicle. In the process of following up the leading vehicle, the processor detects an exit of a traveling road, based on at least one of the map information and a recognition sensor equipped in the vehicle, the exit being positioned forward of the vehicle on the traveling road, and decides a vehicle stop position of the vehicle at the vicinity of the exit, based on a predicted vehicle stop position of the leading vehicle, when an intention to enter the exit is detected from a following vehicle behind the vehicle, the predicted vehicle stop position of the leading vehicle being estimated short of the exit.

5 Claims, 6 Drawing Sheets

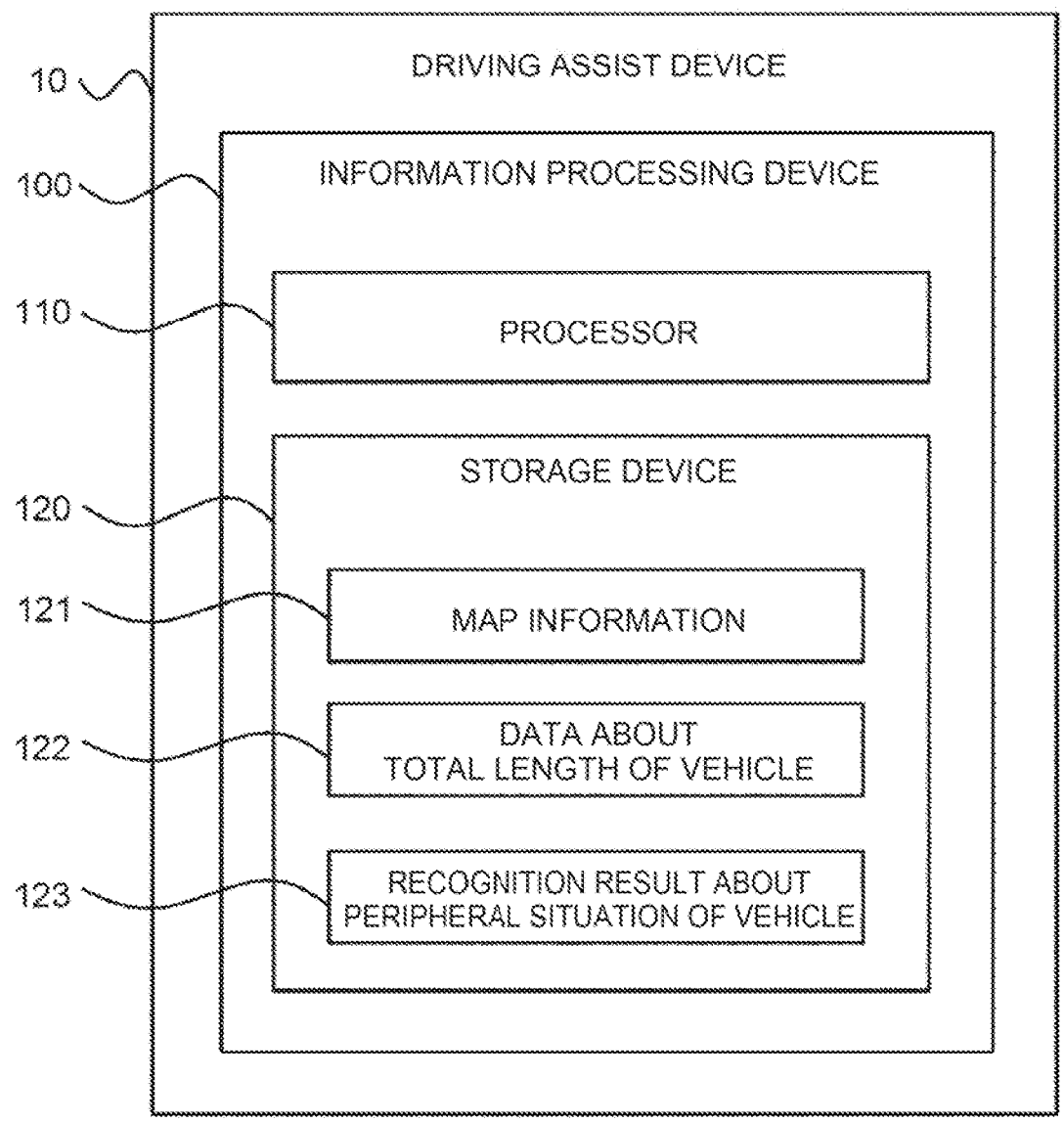

FIG. 6A
FIG. 6B
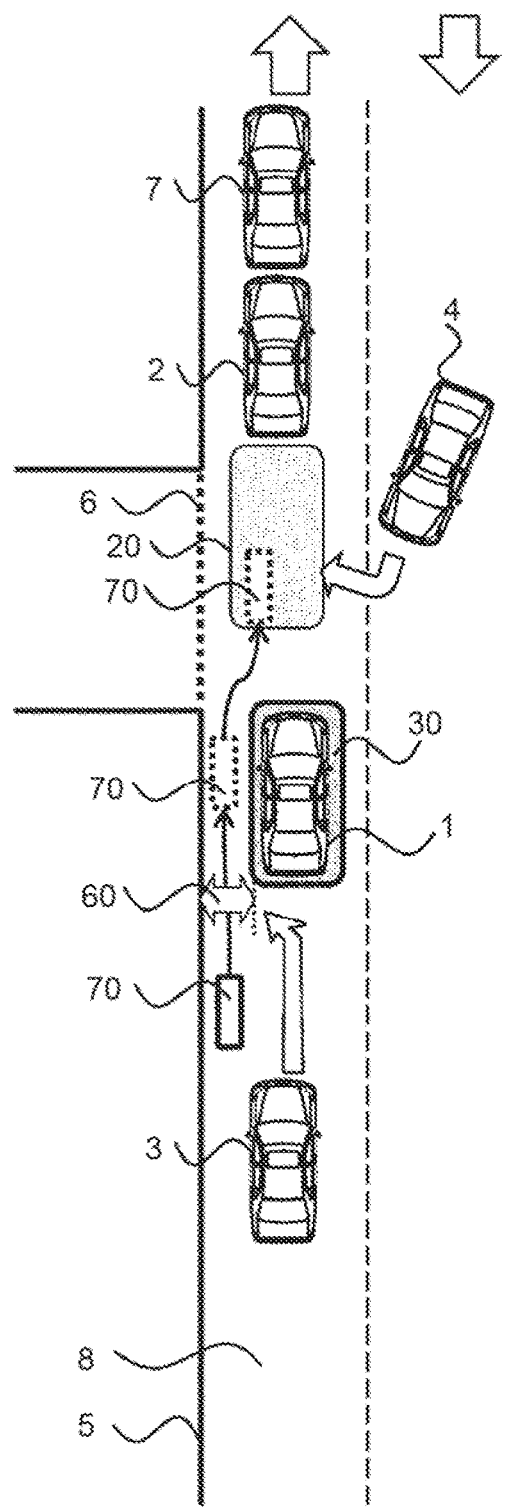
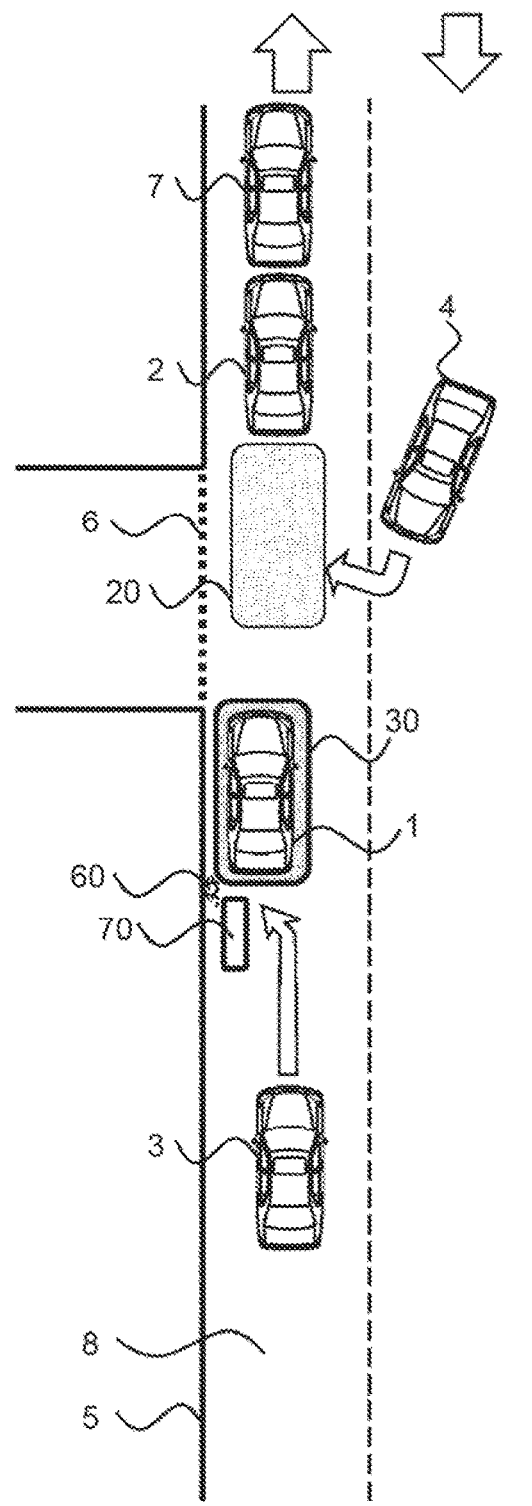

DECIDING A VEHICLE STOP POSITION IN A VICINITY OF AN EXIT WHEN FOLLOWING A LEADING VEHICLE

CROSS-REFERENCE TO RELATED APPLICATION

This application claims priority to Japanese Patent Application No. 2023-032499 filed on Mar. 3, 2023, incorporated herein by reference in its entirety.

BACKGROUND

1. Technical Field

The present disclosure relates to a technology for assisting the driving of a vehicle.

2. Description of Related Art

Japanese Unexamined Patent Application Publication No. 2007-310745 discloses a technology in which the congestion on an opposite lane side due to passage block caused by a right-turn vehicle (right-turn oncoming vehicle) on the opposite lane is prevented before happens. In this related art, the traveling of an own vehicle is controlled such that the own vehicle stops short of an intersection that is at a forward position on a traveling road of the own vehicle and that has no stop line, in the case where it is determined that another vehicle is highly likely to move across the traveling lane at the intersection and where it is determined that the other vehicle needs to stop for passing through the intersection.

SUMMARY

In the case where a leading vehicle of the vehicle stops after passing through an exit of the traveling road, as exemplified by an intersection having no traffic light and an entrance of a parking place of a shop, the vehicle occasionally blocks the passage of a following vehicle that is about to enter the exit, even when there is no right-turn oncoming vehicle.

An object of the present disclosure is to provide a technology that makes it possible to prevent the vehicle from casually blocking the passage of the following vehicle behind the vehicle.

A first aspect of the present disclosure relates to a device that assists driving of a vehicle.

The driving assist device for the vehicle includes:
a storage device that stores map information; and
a processor that executes a process of following up a leading vehicle.

In the process of following up the leading vehicle,
the processor detects an exit of a traveling road, based on at least one of the map information and a recognition sensor equipped in the vehicle, the exit being positioned forward of the vehicle on the traveling road, and decides a vehicle stop position of the vehicle at the vicinity of the exit, based on a predicted vehicle stop position of the leading vehicle, when an intention to enter the exit is detected from a following vehicle behind the vehicle, the predicted vehicle stop position of the leading vehicle being estimated short of the exit.

A second aspect of the present disclosure further has the following characteristics, in addition to the first aspect.

In the decision of the vehicle stop position of the vehicle, when the distance from a passing point of the exit to the predicted vehicle stop position of the leading vehicle is equal to or more than a predetermined distance, the processor may decide that the vehicle stop position of the vehicle is a position following the predicted vehicle stop position of the leading vehicle.

Further, in the decision of the vehicle stop position of the vehicle, when the distance from the passing point of the exit to the predicted vehicle stop position of the leading vehicle is less than the predetermined distance, the processor may decide that the vehicle stop position of the vehicle is a position before passing of the exit.

A third aspect of the present disclosure further has the following characteristics, in addition to the first aspect.

In the decision of the vehicle stop position of the vehicle, the processor may calculate a space width of the exit when the vehicle stop position of the vehicle is a position following the predicted vehicle stop position of the leading vehicle, based on data about the total length of the vehicle, at least one of information that is relevant to the position of the exit and that is included in the map information and information that is relevant to the position of the exit and that is detected by the recognition sensor, and at least one of data that is relevant to the width of the exit and that is included in the map information and data that is relevant to the width of the exit and that is detected by the recognition sensor.

Further, in the decision of the vehicle stop position of the vehicle, when the space width of the exit is equal to or more than a predetermined width, the processor may decide that the vehicle stop position of the vehicle is the position following the predicted vehicle stop position of the leading vehicle Furthermore, in the decision of the vehicle stop position of the vehicle, when the space width of the exit is less than the predetermined width, the processor may decide that the vehicle stop position of the vehicle is a position before passing of the exit.

A fourth aspect of the present disclosure further has the following characteristic, in addition to the second aspect.

When the distance from the passing point of the exit to the predicted vehicle stop position of the leading vehicle is less than the predetermined distance, the processor may further decide that the vehicle stop position of the vehicle is a position that is at a region before the passing of the exit and that is at a left-side region in a traveling lane of the vehicle on the traveling road.

A fifth aspect of the present disclosure further includes the following characteristic, in addition to the third aspect.

When the space width of the exit is less than the predetermined width, the processor may further decide that the vehicle stop position of the vehicle is a position that is at a region before the passing of the exit and that is at a left-side region in a traveling lane of the vehicle on the traveling road.

A sixth aspect of the present disclosure relates to a method for assisting driving of the vehicle.

The driving assist method for the vehicle includes:
executing a process of following up a leading vehicle; and
detecting an exit of a traveling road, based on at least one of map information and a recognition sensor equipped in the vehicle, the exit being positioned forward of the vehicle on the traveling road, and deciding a vehicle stop position of the vehicle at the vicinity of the exit, based on a predicted vehicle stop position of the leading vehicle, when an intention to enter the exit is detected from a following vehicle behind the vehicle, the predicted vehicle stop position of the leading vehicle being estimated short of the exit, in the process of following up the leading vehicle.

With the present disclosure, in the case where the intention to enter the exit of the traveling road is detected from the following vehicle behind the vehicle when the vehicle follows up the leading vehicle, the vehicle stop position of the vehicle at the vicinity of the exit is decided based on the predicted vehicle stop position of the leading vehicle that is estimated short of the exit. Thereby, the vehicle is stopped at an appropriate position after the passing of the exit or before the passing of the exit. Accordingly, it is possible to prevent the vehicle from casually blocking the passage of the following vehicle behind the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a block diagram showing a configuration example of the driving assist device for the vehicle according to the embodiment 1;

FIG. 6A is a diagram for describing a specific example of a driving assist device for the vehicle according to an embodiment 2; and FIG. 6B is a diagram for describing the specific example of the driving assist device for the vehicle according to the embodiment 2.

DETAILED DESCRIPTION OF EMBODIMENTS

Figure 1A:
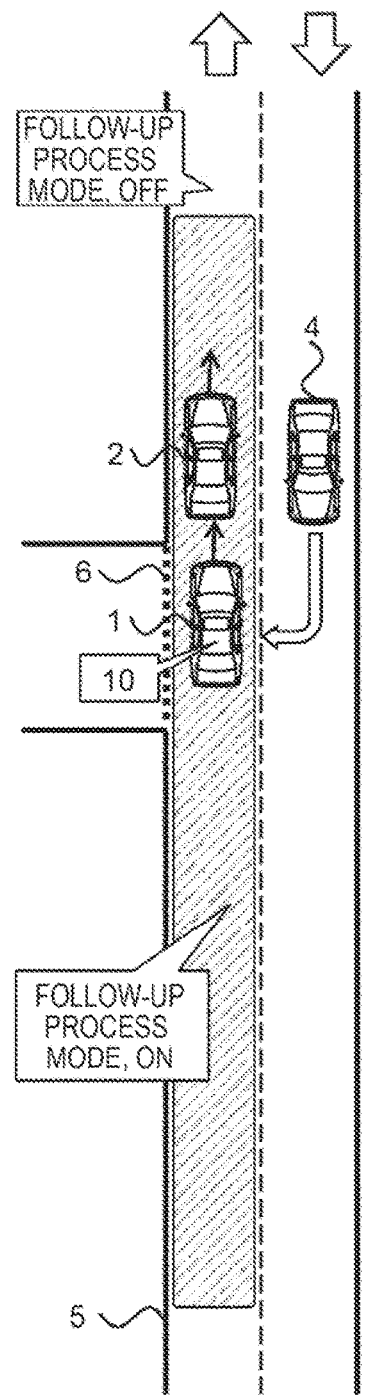
FIG. 1A is a diagram for describing the outline of a driving assist device for a vehicle according to an embodiment 1.

A driving assist device for a vehicle and a driving assist method for a vehicle according to embodiments of the present disclosure will be described with reference to the accompanying drawings. In the figures, common elements are denoted by identical reference characters, and repetitive descriptions are omitted.

1. Embodiment 1

1-1. Outline

Figure 1B:
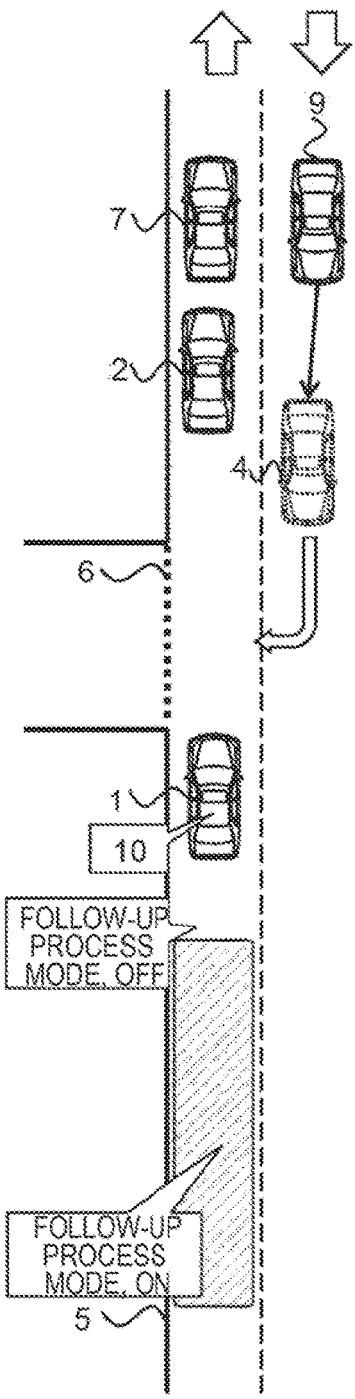
FIG. 1B is a diagram for describing the outline of the driving assist device for the vehicle according to the embodiment 1.
Figure 1C:
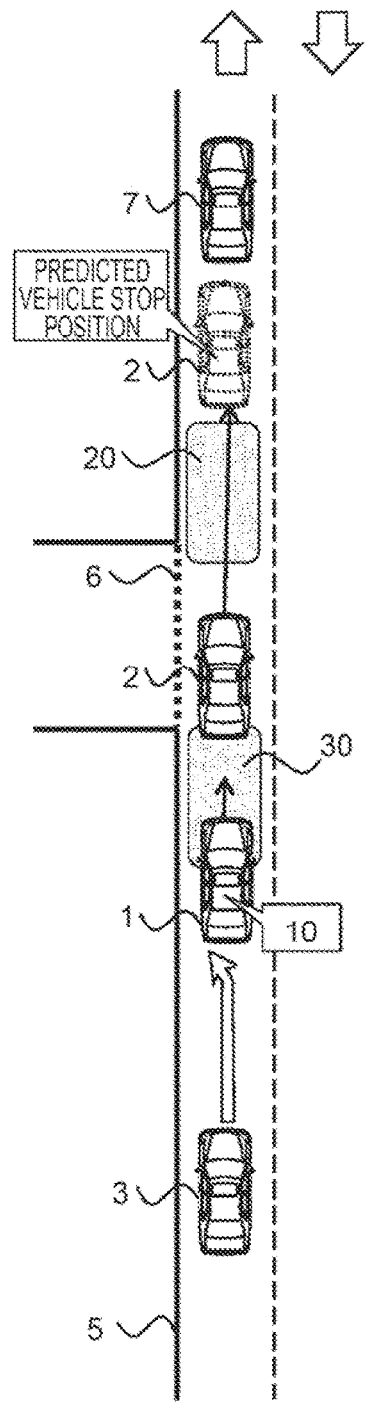
FIG. 1C is a diagram for describing the outline of the driving assist device for the vehicle according to the embodiment 1.

Each of FIG. 1A, FIG. 1B, and FIG. 1C is a diagram for describing the outline of a driving assist device 10 for a vehicle 1 according to an embodiment 1. The driving assist device 10 for the vehicle 1 (also referred to as merely "driving assist device") assists the driving of the vehicle 1. Typically, the driving assist device 10 is equipped in the vehicle 1. At least a part of the driving assist device 10 may be disposed in an external device in the exterior of the vehicle 1, and may remotely assist the driving of the vehicle 1. That is, the driving assist device 10 may be disposed in the vehicle 1 and the external device in a dispersive manner.

The vehicle 1 for which the driving assist is performed by the driving assist device 10 may be a vehicle that performs autonomous driving or may be a vehicle that performs manual driving.

The driving assist device 10 has a function of a follow-up process mode for following up a leading vehicle 2. In the case where a predetermined condition is satisfied, the driving assist device 10 switches the follow-up process mode to an enabled state (ON). On the other hand, in the case where the predetermined condition is not satisfied, the driving assist device 10 maintains the follow-up process mode in a disabled state (OFF).

For example, the predetermined condition is set based on a recognition result about the peripheral situation of the vehicle 1. Specifically, as shown in FIG. 1A, in the case where the recognition result about the peripheral situation of the vehicle 1 includes at least a recognition result about the leading vehicle 2 positioned forward of the vehicle 1, the driving assist device 10 determines that the predetermined condition is satisfied. That is, examples of the predetermined condition include at least the condition that the leading vehicle 2 exists forward of the vehicle 1.

The recognition result about the peripheral situation of the vehicle 1 is recognized by a recognition sensor (a camera, a radar, or a LiDAR) equipped in the vehicle 1.

In the case where the follow-up process mode is switched to the enabled state, the driving assist device 10 performs a follow-up process of following up the leading vehicle 2 that travels forward of the vehicle 1. Examples of the follow-up process include a process of setting the distance between the vehicle 1 and the leading vehicle 2 to a predetermined interval (for example, 5 m to 10 m).

Suppose that the vehicle 1 passes through an exit 6 of a traveling road 5 that is positioned forward of the vehicle 1 during the execution of the follow-up process. In this case, as shown in FIG. 1A, even when there is a right-turn oncoming vehicle 4 that is about to enter the exit 6 of the traveling road 5, the traveling of the vehicle 1 for following up the leading vehicle 2 may be continued in the case where the leading vehicle 2 does not stop after passing through the exit 6 of the traveling road 5. Examples of the exit 6 of the traveling road 5 include an intersection having no traffic light and an entrance of a parking place of a shop. Further, the above-described recognition result about the peripheral situation of the vehicle 1 further includes information about the detection position of the exit 6 of the traveling road 5 and a recognition result about the right-turn oncoming vehicle 4.

Suppose that there is a stopped vehicle 7 that is positioned forward of the leading vehicle 2 after the passing of the exit 6 of the traveling road 5 as shown in FIG. 1B. In this case, the driving assist device 10 may disable the follow-up process mode short of the exit 6 of the traveling road 5, and may stop the vehicle 1 before the passing of the exit 6 of the traveling road 5. Thereby, in the case where an oncoming vehicle 9 shown in FIG. 1B is the right-turn oncoming vehicle 4, the block of the passage of the right-turn oncoming vehicle 4 is prevented. After the follow-up process mode is disabled, the vehicle 1 travels in an autonomous driving function mode.

Furthermore, suppose that there is a following vehicle 3 behind the vehicle 1 as shown in FIG. 1C. In this case, there can be a case where the following vehicle 3 behind the vehicle 1 moves straight without entering the exit 6 of the traveling road 5 and a case where the following vehicle 3 behind the vehicle 1 enters the exit 6 of the traveling road 5. In the case where the following vehicle 3 behind the vehicle 1 enters the exit 6 of the traveling road 5, the vehicle 1 blocks the passage of the following vehicle 3 behind the vehicle 1, when the vehicle 1 stops before the passing of the exit 6 of the traveling road 5 even though the vehicle 1 can stop at a position following the leading vehicle 2.

Accordingly, the driving assist device 10 according to the embodiment 1 determines whether the following vehicle 3 behind the vehicle 1 has an intention to enter the exit 6 of the traveling road 5. Then, in the case where it is determined that the following vehicle 3 behind the vehicle 1 has the intention to enter the exit 6 of the traveling road 5, the driving assist device 10 estimates a predicted vehicle stop position of the leading vehicle 2, short of the exit 6 of the traveling road 5. Thereafter, based on the estimated predicted vehicle stop position of the leading vehicle 2, the driving assist device 10 decides the vehicle stop position of the vehicle 1 at the vicinity of the exit 6 of the traveling road 5.

For example, the intention of the following vehicle 3 is detected based on the change in the vehicle state of the following vehicle 3. Examples of the change in the vehicle state of the following vehicle 3 include the change in the lighting state of a direction indicator of the following vehicle 3, the change in the inter-vehicle distance from the following vehicle 3, the change in the lateral position of the following vehicle 3, and the motion of the face of the driver of the following vehicle 3. For example, the motion of the face of the driver of the following vehicle 3 is recognized by a rearward camera included in the vehicle 1.

For example, the predicted vehicle stop position of the leading vehicle 2 is estimated based on the change in the inter-vehicle distance from the leading vehicle 2 and the change in the relative speed to the leading vehicle 2. The inter-vehicle distance from the leading vehicle 2 and the relative speed to the leading vehicle 2 are calculated based on information acquired from the recognition sensor equipped in the vehicle 1. The predicted vehicle stop position of the leading vehicle 2 may be information included in the above-described recognition result about the leading vehicle 2.

As shown in FIG. 1C, examples of the vehicle stop position of the vehicle 1 include a position (first vehicle stop position candidate 20) following the predicted vehicle stop position of the leading vehicle 2 and a position (second vehicle stop position candidate 30) before the passing of the exit 6 of the traveling road 5.

Two specific examples of a method for deciding the vehicle stop position of the vehicle 1 when the intention to enter the exit 6 of the traveling road 5 is detected from the following vehicle 3 behind the vehicle 1 will be described below.

1-2. Specific Example 1-2-1. First Example

Figure 2A:
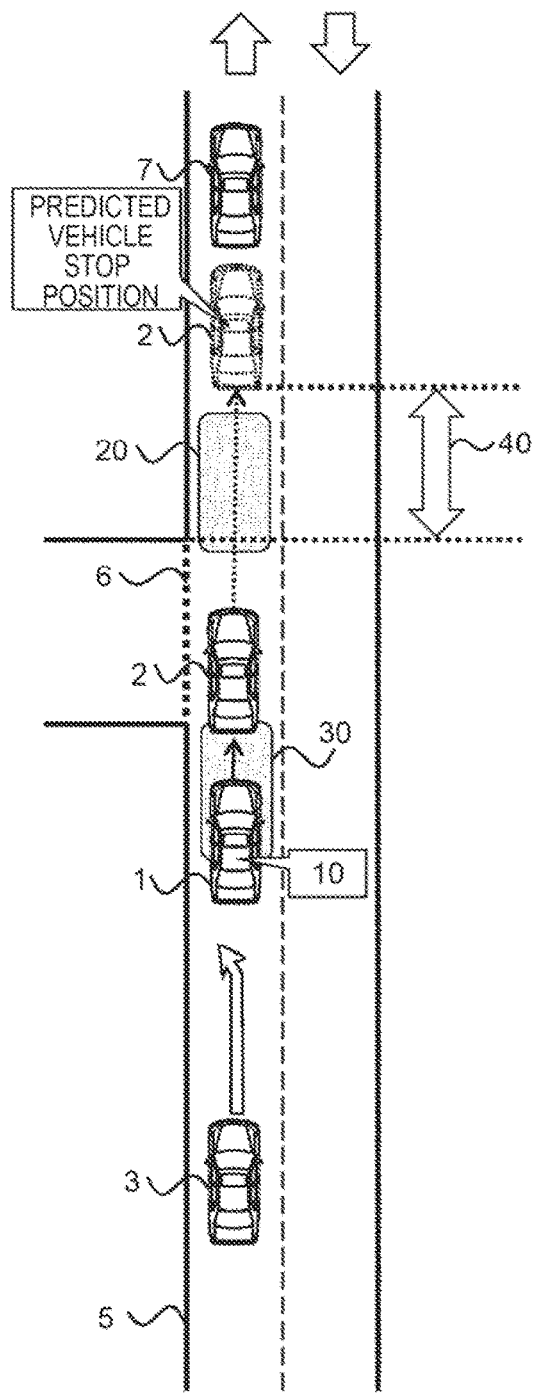
FIG. 2A is a diagram for describing a specific example of a first example of the driving assist device for the vehicle according to the embodiment 1.
Figure 2B:
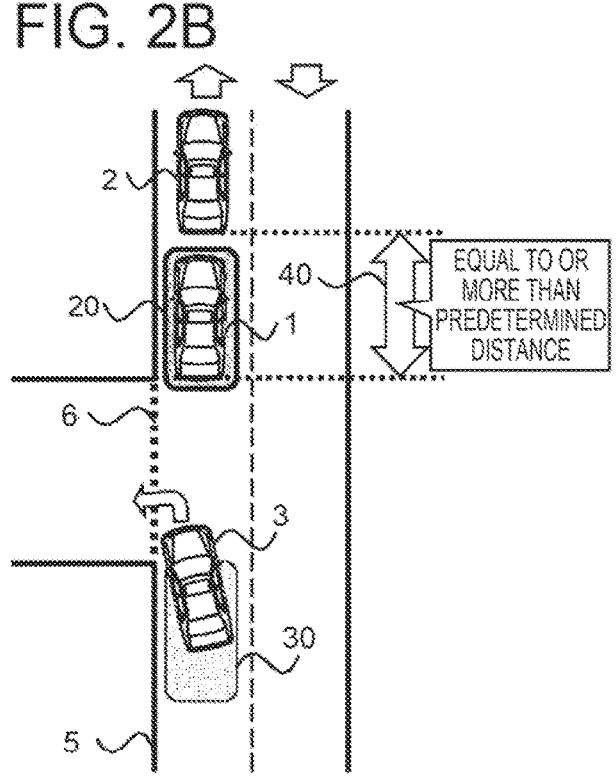
FIG. 2B is a diagram for describing the specific example of the first example of the driving assist device for the vehicle according to the embodiment 1.
Figure 2C:
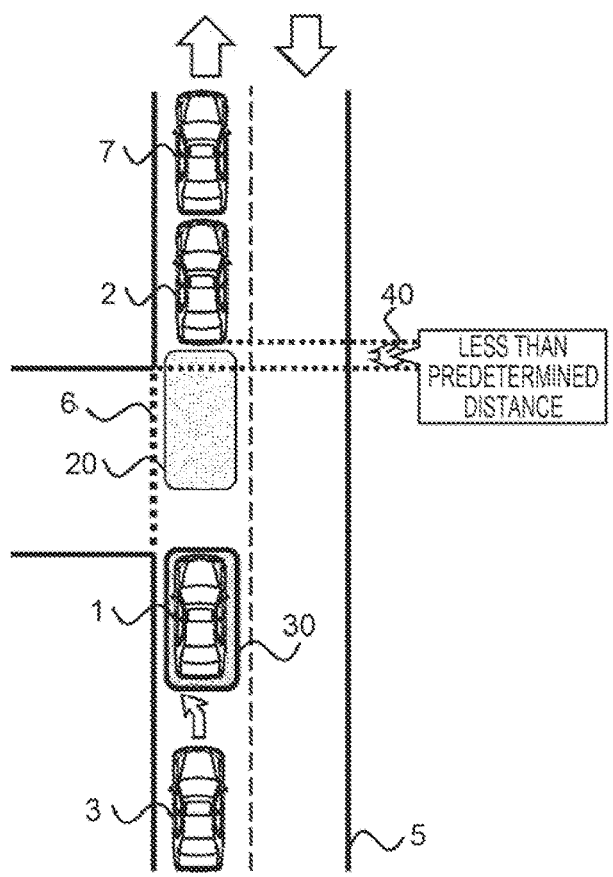
FIG. 2C is a diagram for describing the specific example of the first example of the driving assist device for the vehicle according to the embodiment 1.

Each of FIG. 2A, FIG. 2B, and FIG. 2C is a diagram for describing a specific example of a first example of the driving assist device 10 according to the embodiment 1. In the specific example of the first example of the driving assist device 10 according to the embodiment 1, as shown in FIG. 2A, the vehicle stop position of the vehicle 1 is decided based on the distance (first space width 40) from a passing point of the exit 6 of the traveling road 5 to the predicted vehicle stop position of the leading vehicle 2.

Specifically, in the case where the first space width 40 is equal to or more than a predetermined distance, the driving assist device 10 decides that the vehicle stop position of the vehicle 1 is the first vehicle stop position candidate 20, as shown in FIG. 2B. On the other hand, in the case where the first space width 40 is less than the predetermined distance, the driving assist device 10 decides that the vehicle stop position of the vehicle 1 is the second vehicle stop position candidate 30, as shown in FIG. 2C.

The first space width 40 is calculated based on the distance from the vehicle 1 to the predicted vehicle stop position of the leading vehicle 2 and position information about the exit 6 of the traveling road 5. For example, the distance from the vehicle 1 to the predicted vehicle stop position of the leading vehicle 2 is measured by the recognition sensor equipped in the vehicle 1. The position information about the exit 6 of the traveling road 5 may be information (first information) included in the map information, may be information (second information) detected by the recognition sensor, or may be information calculated from the first information and the second information. For example, the predetermined distance may be the total length of the vehicle 1, or may be a predetermined percentage (for example, 80%) of the total length of the vehicle 1.

1-2-2. Second Example

Figure 3A:
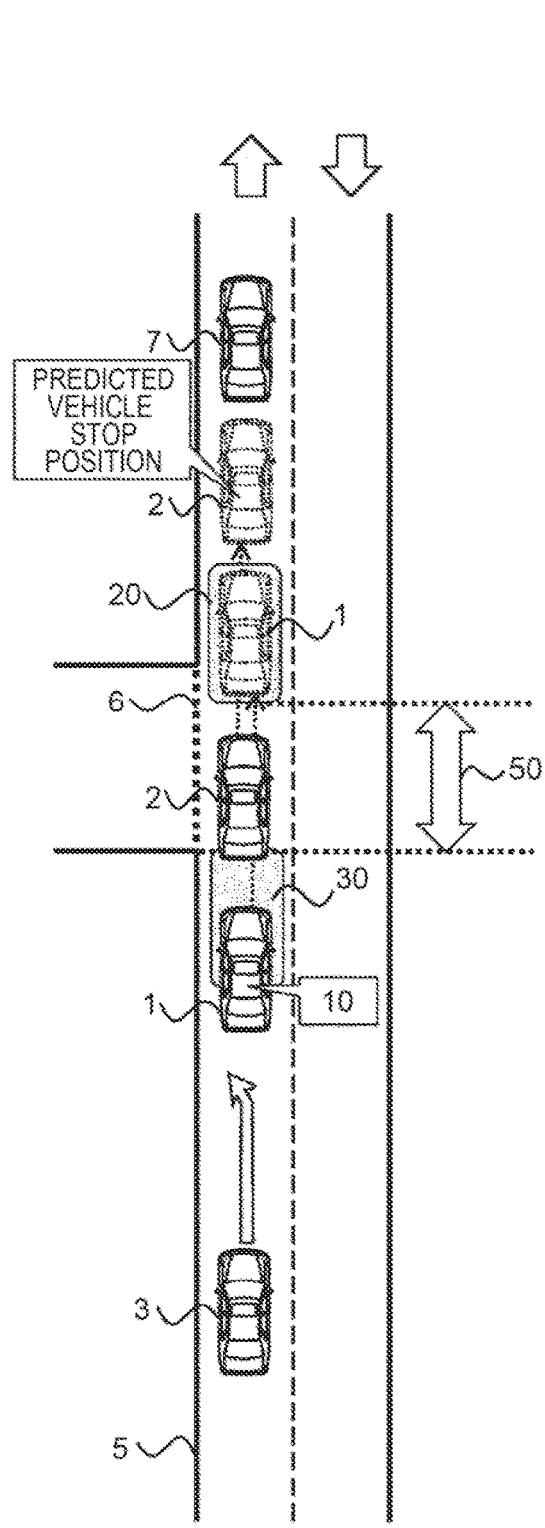
FIG. 3A is a diagram for describing a specific example of a second example of the driving assist device for the vehicle according to the embodiment 1.
Figure 3B:
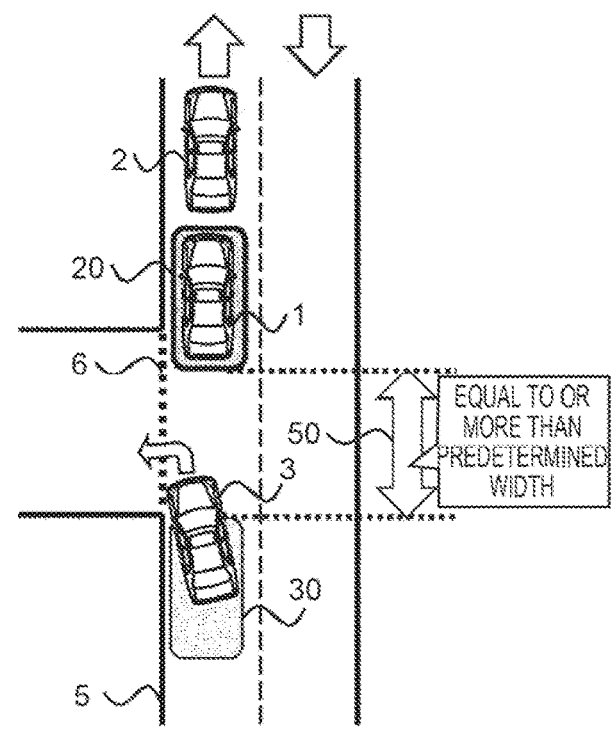
FIG. 3B is a diagram for describing the specific example of the second example of the driving assist device for the vehicle according to the embodiment 1.
Figure 3C:
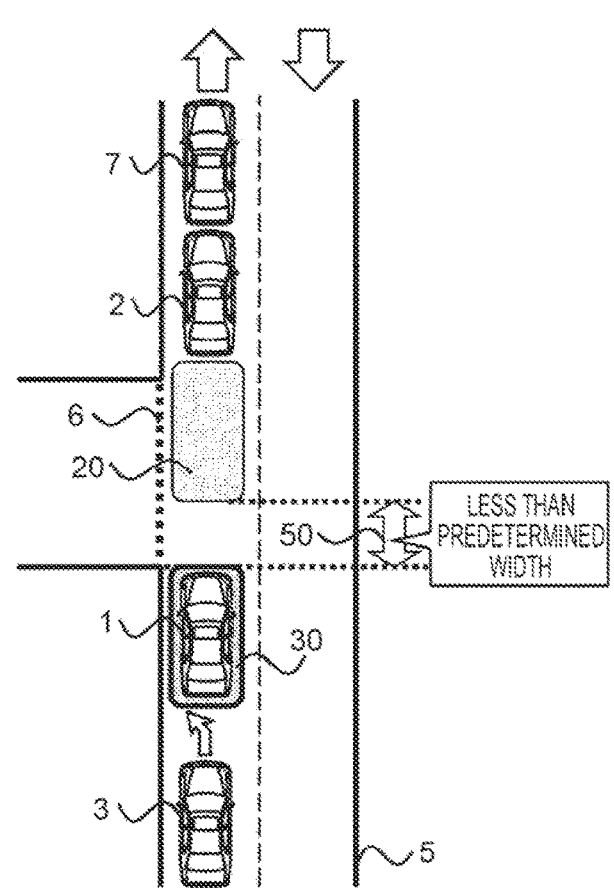
FIG. 3C is a diagram for describing the specific example of the second example of the driving assist device for the vehicle according to the embodiment 1.

Each of FIG. 3A, FIG. 3B, and FIG. 3C is a diagram for describing a specific example of a second example of the driving assist device 10 according to the embodiment 1. In the specific example of the second example of the driving assist device 10 according to the embodiment 1, as shown in FIG. 3A, the vehicle stop position of the vehicle 1 is decided based on a space width (second space width 50) of the exit 6 of the traveling road 5 when the vehicle stop position of the vehicle 1 is the first vehicle stop position candidate 20.

Specifically, in the case where the second space width 50 is equal to or more than a predetermined width, the driving assist device 10 decides that the vehicle stop position of the vehicle 1 is the first vehicle stop position candidate 20, as shown in FIG. 3B. On the other hand, in the case where the second space width 50 is less than the predetermined width, the driving assist device 10 decides that the vehicle stop position of the vehicle 1 is the second vehicle stop position candidate 30, as shown in FIG. 3C.

The second space width 50 is calculated based on the distance from the vehicle 1 to the predicted vehicle stop position of the leading vehicle 2, the position information about the exit 6 of the traveling road 5, and data about the width of the exit 6 of the traveling road 5. The distance from the vehicle 1 to the predicted vehicle stop position of the leading vehicle 2 is measured by the same method as the above-described first space width 40. The position information about the exit 6 of the traveling road 5 and the data about the width of the exit 6 of the traveling road 5 may be information (third information) included in the map information, may be information (fourth information) detected by the recognition sensor, or may be information calculated from the third information and the fourth information. For example, the predetermined width is a width resulting from adding a predetermined margin (for example, 1 m) to a standard vehicle width.

1-2-3. Effect

In this way, in the driving assist device 10 for the vehicle 1 according to the embodiment 1, in the case where the intention to enter the exit 6 of the traveling road 5 is detected from the following vehicle 3 behind the vehicle 1 when the vehicle 1 follows up the leading vehicle 2, the vehicle stop position of the vehicle 1 at the vicinity of the exit 6 of the traveling road 5 is decided based on the predicted vehicle stop position of the leading vehicle 2 that is estimated short of the exit 6 of the traveling road 5. Thereby, the vehicle 1 is stopped at an appropriate position after the passing of the exit 6 of the traveling road 5 or before the passing of the exit 6 of the traveling road 5. Accordingly, it is possible to prevent the vehicle 1 from casually blocking the passage of the following vehicle 3 behind the vehicle 1.

1-3. Configuration Example

FIG. 4 is a block diagram showing a configuration example of the driving assist device 10 according to the embodiment 1. The driving assist device 10 includes an information processing device 100. The information processing device 100 includes one or a plurality of processors 110 (referred to as merely a processor 110, hereinafter) and one or a plurality of storage devices 120 (referred to as merely a storage device 120, hereinafter). The processor 110 executes a variety of processes. The storage device 120 stores a variety of information necessary for the processes by the processor 110. Examples of the storage device 120 include a volatile memory, a non-volatile memory, a hard disk drive (HDD), and a solid state drive (SSD).

The variety of information stored in the storage device 120 includes map information 121, data 122 about the total length of the vehicle 1, and a recognition result 123 about the peripheral situation of the vehicle 1. The map information 121 includes the position information about the exit 6 of the traveling road 5 and the data about the width of the exit 6 of the traveling road 5. The recognition result 123 about the peripheral situation of the vehicle 1 includes the recognition result about the traveling road 5 of the vehicle 1, the recognition result about the leading vehicle 2, the recognition result about the right-turn oncoming vehicle 4, and the information about the detection position of the exit 6 of the traveling road 5.

Further, the variety of information stored in the storage device 120 includes a driving assist program (not illustrated). The driving assist program is a computer program that is executed by the processor 110. By the execution of the driving assist program by the processor 110, the function of the information processing device 100 is realized. The driving assist program may be stored in the storage device 120, may be stored in a memory built in the processor 110, or may be recorded in a computer-readable storage medium.

1-4. Process Example

Figure 5:
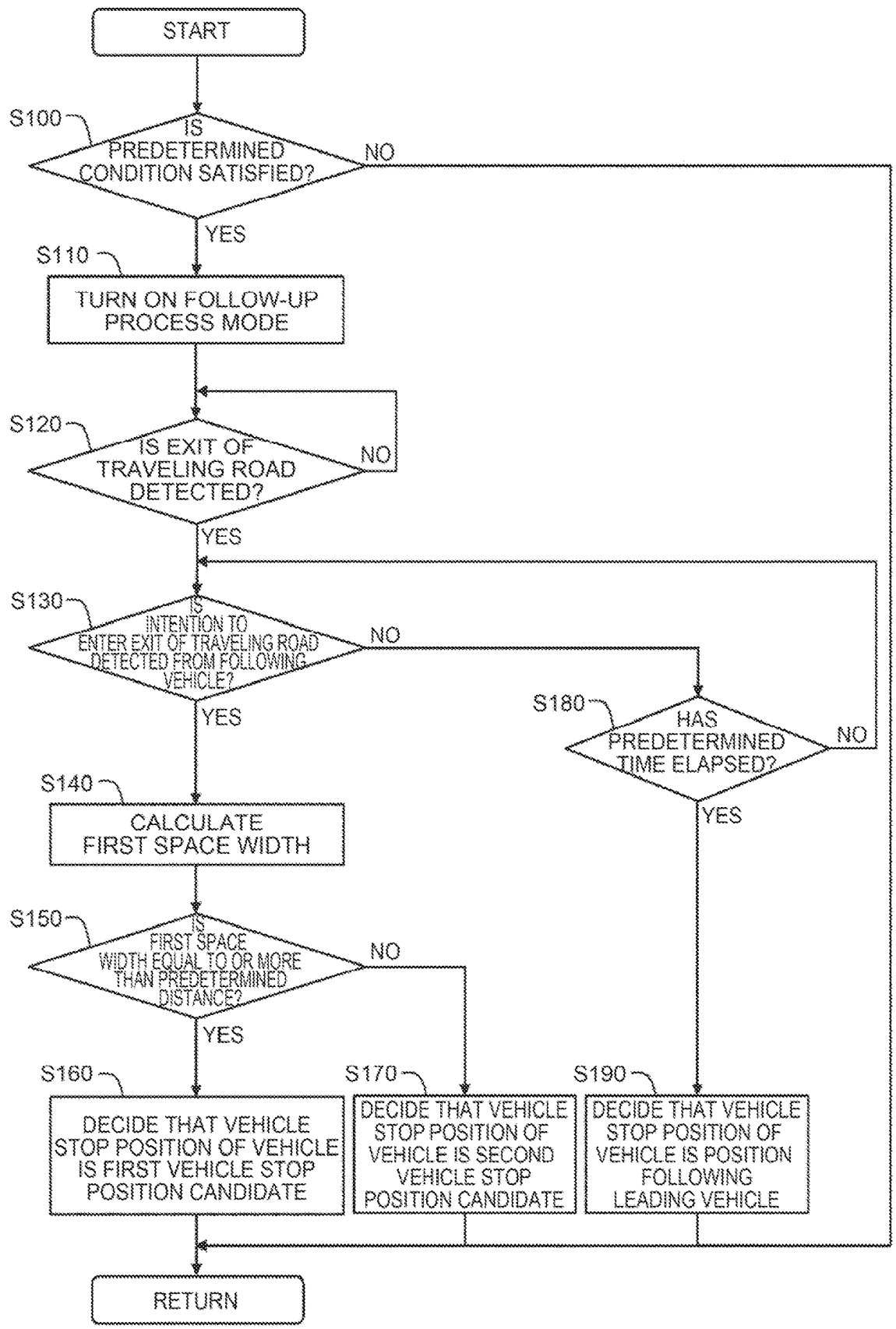
FIG. 5 is a flowchart showing a process example in the driving assist device for the vehicle according to the embodiment 1.

FIG. 5 is a flowchart showing a process example in the information processing device 100 of the driving assist device 10 according to the embodiment 1. The description about a process example of the above-described second example can be performed by replacing the "first space width 40" in a process example of the first example with the "second space width 50" and replacing the "predetermined distance" in the process example of the first example with the "predetermined width". Accordingly, here, the description about the process example of the first example is performed, and the description about the process example of the second example is omitted.

In S100, the information processing device 100 determines whether the predetermined condition is satisfied. In the case where it is determined that the predetermined condition is satisfied (S100; Yes), the process proceeds to S110. In the other case (S100; No), the process ends. The predetermined condition includes at least the condition that the leading vehicle 2 exists forward of the vehicle 1. Whether the leading vehicle 2 exists forward of the vehicle 1 is recognized by the recognition sensor equipped in the vehicle 1.

In S110, the information processing device 100 enables (turns on) the follow-up process mode for following up the leading vehicle 2. Thereafter, the process proceeds to S120.

In S120, the information processing device 100 determines whether the exit 6 of the traveling road 5 that is positioned forward of the vehicle 1 is detected. In the case where it is determined that the exit 6 of the traveling road 5 that is positioned forward of the vehicle 1 is detected (S120; Yes), the process proceeds to S130. In the other case (S120; No), the process returns to S120.

In S130, the information processing device 100 determines whether the intention to enter the exit 6 of the traveling road 5 is detected from the following vehicle 3. In the case where it is determined that the intention to enter the exit 6 of the traveling road 5 is detected from the following vehicle 3 (S130; Yes), the process proceeds to S140. In the other case (S130; No), the process proceeds to S180.

In S140, the information processing device 100 calculates the first space width 40. Thereafter, the process proceeds to S150.

In S150, the information processing device 100 determines whether the first space width 40 is equal to or more than the predetermined distance. In the case where it is determined that the first space width 40 is equal to or more than the predetermined distance (S150; Yes), the process proceeds to S160. In the other case (S150; No), the process proceeds to S170.

In S160, the information processing device 100 decides that the vehicle stop position of the vehicle 1 is the first vehicle stop position candidate 20.

In S170, the information processing device 100 decides that the vehicle stop position of the vehicle 1 is the second vehicle stop position candidate 30.

In S180, the information processing device 100 determines whether a predetermined time has elapsed. In the case where it is determined that the predetermined time has elapsed (S180; Yes), the process proceeds to S190. In the other case (S180; No), the process returns to S130.

In S190, the information processing device 100 decides that the vehicle stop position of the vehicle 1 is the position following the leading vehicle 2.

2. Embodiment 2

Each of FIG. 6A and FIG. 6B is a diagram for describing a specific example of a driving assist device 10 according to an embodiment 2. In the driving assist device 10 according to the embodiment 1, in the case where the first space width 40 is less than the predetermined distance or in the case where the second space width 50 is less than the predetermined width, it is decided that the vehicle stop position of the vehicle 1 is the second vehicle stop position candidate 30. In this case, when a space width (third space width 60) between a left end (for example, a white line) of the traveling road 5 and the vehicle 1 stopped at the second vehicle stop position candidate 30 is equal to or more than a predetermined value, a bike 70 is likely to overtake the vehicle 1 through the third space width 60, as shown in FIG. 6A. In the case where the timing when the bike 70 overtakes the vehicle 1 and the timing when the vehicle 1 starts moving are the same, there is fear of the contact between the bike 70 and the vehicle 1. Alternatively, in the case where the timing when the bike 70 overtakes the vehicle 1 and the timing when the right-turn oncoming vehicle 4 enters the exit 6 of the traveling road 5 are the same, there is fear of the contact between the bike 70 and the right-turn oncoming vehicle 4, as shown in FIG. 6A.

With the driving assist device 10 according to the embodiment 2, in the case where the first space width 40 is less than the predetermined distance or in the case where the second space width 50 is less than the predetermined width, it is decided that the vehicle stop position of the vehicle 1 is a position that is at a region before the passing of the exit 6 of the traveling road 5 and that is at a left-side region in a traveling lane 8 of the vehicle 1 on the traveling road 5, as shown in FIG. 6B.

The left-side region in the traveling lane 8 of the vehicle 1 on the traveling road 5 means a region where the third space width 60 is less than a predetermined value. For example, the third space width 60 is calculated based on white line recognition information about the traveling road 5 and the information about the second vehicle stop position candidate 30. The white line recognition information about the traveling road 5 may be information included in the above-described recognition result about the peripheral situation of the vehicle 1.

Thereby, the traveling safety of a moving body (the vehicle 1, the following vehicle 3, the right-turn oncoming vehicle 4, the bike 70, or the like) that travels at the vicinity of the exit 6 of the traveling road 5 is secured, in addition to the same effect as the effect in the embodiment 1.

3. Embodiment 3

In the case where the intention to enter the exit 6 of the traveling road 5 is not detected from the following vehicle 3 behind the vehicle 1, it is decided that the vehicle stop position of the vehicle 1 is the position following the leading vehicle 2, as shown in S190 of FIG. 5. In this case, there can be a case where the vehicle stop position of the vehicle 1 becomes a position that is in the middle of the passing of the exit 6 of the traveling road 5 and where the condition about the first space width 40 or the second space width 50 is not satisfied. In this case, when there is the right-turn oncoming vehicle 4 that is about to enter the exit 6 of the traveling road 5, there is fear that the passage of the right-turn oncoming vehicle 4 is blocked, even when the passage of the following vehicle 3 is not blocked.

With a driving assist device 10 according to an embodiment 3, in the case where the intention to enter the exit 6 of the traveling road 5 is not detected from the following vehicle 3 behind the vehicle 1 and where the right-turn oncoming vehicle 4 is recognized short of the exit 6 of the traveling road 5, the processes of S140 to S170 shown in FIG. 5 may be performed. Thereby, it is possible to prevent the block of the passage of the right-turn oncoming vehicle 4 that is about to enter the exit 6 of the traveling road 5, in addition to the same effect as the effect in the embodiment 1.

The recognition result about the right-turn oncoming vehicle 4 may be information included in the recognition result about the peripheral situation of the vehicle 1. Further, the recognition result about the right-turn oncoming vehicle 4 may include the predicted vehicle stop position of the right-turn oncoming vehicle 4.

What is claimed is:

1. A driving assist device for a vehicle, the driving assist device for the vehicle being a device that assists driving of the vehicle, the driving assist device for the vehicle comprising:
a storage device that stores map information; and
a processor that executes a process of following up a leading vehicle, wherein in the process of following up the leading vehicle,
the processor is configured to:
detect an exit of a traveling road, based on at least one of the map information and a recognition sensor equipped in the vehicle, the exit being positioned forward of the vehicle on the traveling road,
estimate a vehicle stop position of the leading vehicle before the vehicle reaches the exit,
determine a vehicle stop position of the vehicle at a vicinity of the exit, based on the estimated vehicle stop position of the leading vehicle, when an intention to enter the exit is detected from a following vehicle behind the vehicle, and
control the vehicle to stop at the vehicle stop position of the vehicle.

2. The driving assist device for the vehicle according to claim 1, wherein
in the determination of the vehicle stop position of the vehicle,
when a distance from a passing point of the exit to the predicted vehicle stop position of the leading vehicle is equal to or more than a predetermined distance, the processor determines that the vehicle stop position of the vehicle is a position following the predicted vehicle stop position of the leading vehicle, and
when the distance is less than the predetermined distance, the processor determines that the vehicle stop position of the vehicle is a position before passing of the exit.

3. The driving assist device for the vehicle according to claim 2, wherein when the distance is less than the predetermined distance, the processor further determines that the vehicle stop position of the vehicle is a position that is at a region before the passing of the exit and that is at a left-side region in a traveling lane of the vehicle on the traveling road.

4. The driving assist device for the vehicle according to claim 1, wherein
in the determination of the vehicle stop position of the vehicle,
the processor calculates a space width of the exit when the vehicle stop position of the vehicle is a position following the predicted vehicle stop position of the leading vehicle, based on data about a total length of the vehicle, at least one of information that is relevant to a position of the exit and that is included in the map information and information that is relevant to the position of the exit and that is detected by the recognition sensor, and at least one of data that is relevant to a width of the exit and that is included in the map information and data that is relevant to the width of the exit and that is detected by the recognition sensor, when the space width is equal to or more than a predetermined width, the processor determines that the vehicle stop position of the vehicle is the position following the predicted vehicle stop position of the leading vehicle, and when the space width is less than the predetermined width, the processor determines that the vehicle stop position of the vehicle is a position before passing of the exit.

5. A driving assist method for a vehicle, the driving assist method for the vehicle being a method for assisting driving of the vehicle, the driving assist method for the vehicle comprising:
executing a process of following up a leading vehicle; and detecting an exit of a traveling road, based on at least one of map information and a recognition sensor equipped in the vehicle, the exit being positioned forward of the vehicle on the traveling road, estimating a vehicle stop position of the leading vehicle before the vehicle reaches the exit, determining a vehicle stop position of the vehicle at a vicinity of the exit, based on a the estimated vehicle stop position of the leading vehicle, when an intention to enter the exit is detected from a following vehicle behind the vehicle, and controlling the vehicle to stop at the vehicle stop position of the vehicle.

* * * * *